United States Patent [19]

Nagano et al.

[11] 4,395,506

[45] Jul. 26, 1983

[54] ADDITION OF MINERAL RUBBER TO HALOBUTYL BLENDS

[75] Inventors: Hayao Nagano, Yokohama, Japan; Bernard J. Costemalle, Rhode-Saint-Genese, Belgium

[73] Assignee: Exxon Research & Engineering Co., Florham Park, N.J.

[21] Appl. No.: 273,314

[22] Filed: Jun. 15, 1981
(Under 37 CFR 1.47)

[30] Foreign Application Priority Data

Jun. 13, 1980 [JP] Japan ................................. 55-80088

[51] Int. Cl.³ .............................................. C08L 95/00
[52] U.S. Cl. ...................................... 524/68; 524/71; 524/705
[58] Field of Search ............................ 524/68, 71, 705

[56] References Cited

U.S. PATENT DOCUMENTS

| | | | |
|---|---|---|---|
| 2,485,625 | 10/1949 | Merley et al. | 524/68 |
| 2,992,670 | 7/1961 | Hawley | 152/330 |
| 3,277,038 | 10/1966 | Wood | 524/71 |
| 3,985,832 | 10/1976 | Newman | 526/296 |

Primary Examiner—Melvyn I. Marquis
Attorney, Agent, or Firm—H. L. Cohen

[57] ABSTRACT

The incorporation of minor amounts of mineral rubber (blown asphalt) in compositions comprising blends of both chlorobutyl and bromobutyl rubbers results in high adhesion to natural rubber or natural rubber/-polybutadiene rubber substrates.

5 Claims, 4 Drawing Figures

ADHESION OF HALOBUTYL BLENDS TO 60/40 NATURAL RUBBER/POLYBUTADIENE TIRE CARCASS COMPOUND (UNAGED SAMPLES)

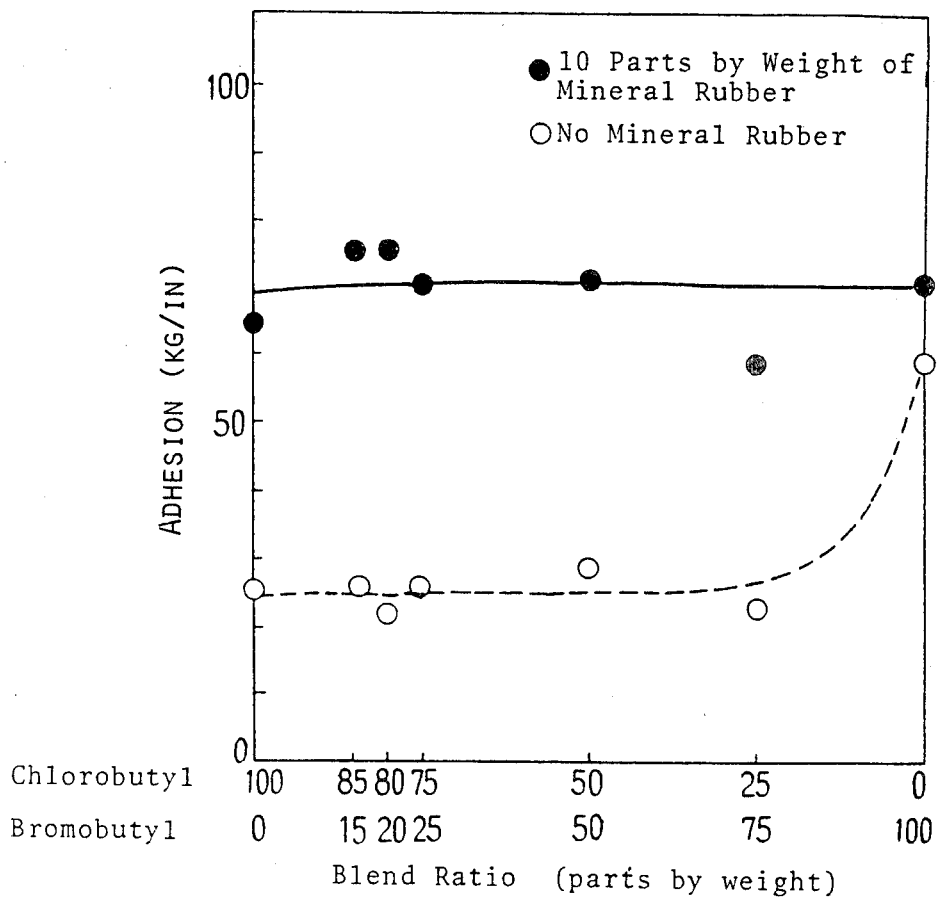

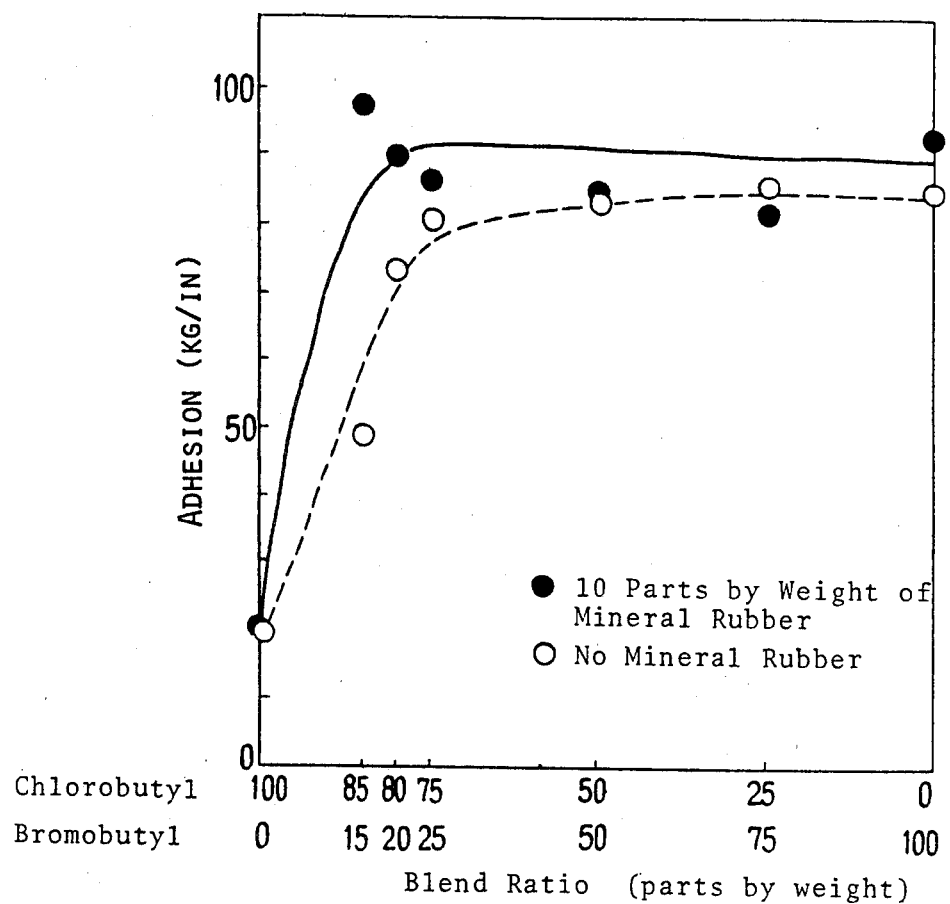

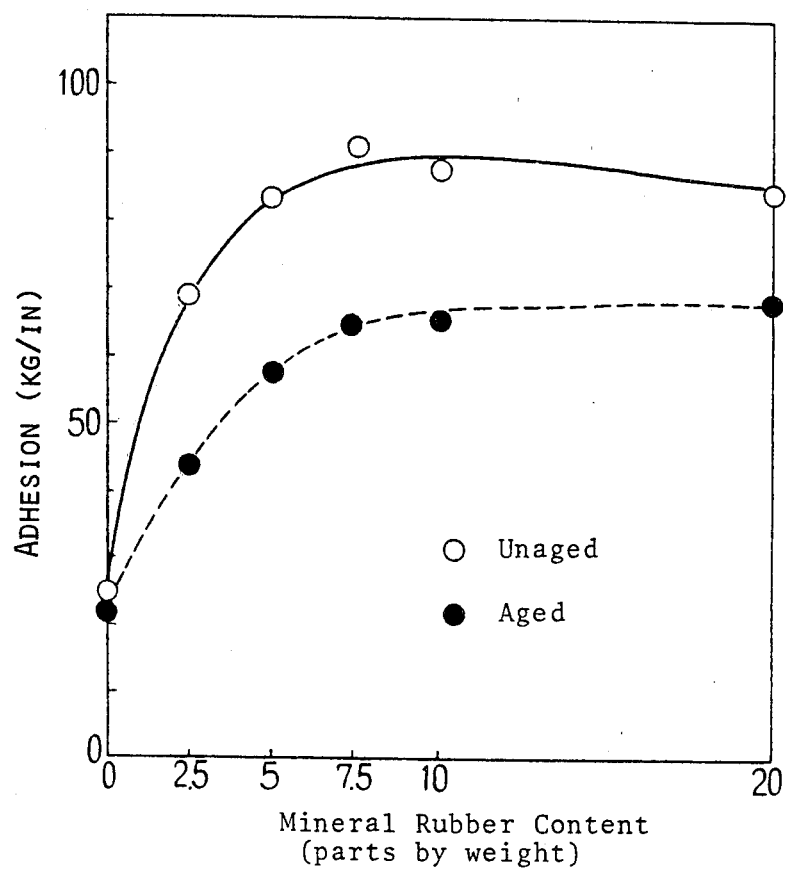

ADDITION OF MINERAL RUBBER TO HALOBUTYL BLENDS

The present invention relates to a rubber compound having high cured adhesion to high unsaturation rubbers, which rubber compound comprises chlorobutyl rubber, bromobutyl rubber and mineral rubber.

Chlorobutyl rubber has excellent properties such as air impermeability, flex properties, heat resistance and aging properties, and is consequently used for a wide variety of applications such as innerliners and sidewalls of tires, conveyor or power transmission belting, steam hoses, wire insulation, etc. Chlorobutyl rubber has proved to be useful in applications inaccessible to butyl rubber. This is due to the fact that chlorine sites in chlorobutyl rubber enhance covulcanization thereof with high unsaturation rubbers. However, when chlorobutyl rubber is used for a tire innerliner without blending it with a high unsaturation rubber like natural rubber, some users consider that it does not give sufficient adhesion to carcass compounds. Such a disadvantage is more noticeable when the carcass is made of a blend of natural rubber and polybutadiene or natural rubber and a styrene-butadiene rubber than when it is made of natural rubber alone.

Various attempts have been made to improve the adhesion properties of chlorobutyl rubber. One of them is a technique taught by U.S. Pat. No. 2,992,670, which comprises the addition of a small amount of brominated butyl rubber to chlorinated butyl rubber. The blend of chlorinated butyl rubber and brominated butyl rubber has adhesion properties higher than are expected from the adhesion properties of each component alone according to proportional allotment. However, in spite of such a synergistic effect in the improvement of adhesion, the adhesion properties of the chlorobutyl/bromobutyl blend was not found sufficiently high under all conditions.

Another method is disclosed by U.S. Pat. No. 3,985,832, which comprises the addition of bromine- or iodine-containing chemical agents to a chlorobutyl rubber compound. Such chemical agents include α-bromoacetophenone, bromodiphenylmethane, α-iodoacetophenone, iodoacetic acid, etc. However, these bromine- or iodine-containing chemical agents have several practical disadvantages, such as their toxicity or difficult availability or difficult processing (dispersion).

Accordingly, an object of the present invention is to provide halogenated butyl rubber compounds of good practical use having improved cured adhesion to high unsaturation rubbers.

In accordance with the present invention there is provided a rubber compound having high cured adhesion to high unsaturation rubbers, which compound includes chlorobutyl rubber, bromobutyl rubber and mineral rubber.

In the present invention, mineral rubber is added to a blend of chlorobutyl and bromobutyl rubbers, which results in enhanced adhesion to high unsaturation rubber compounds. The presence of both of chlorobutyl and bromobutyl rubbers is important. If either of these halogenated butyl rubbers is lacking, the resulting composition would not provide significant improvement in adhesion even with the addition of mineral rubber.

When mineral rubber is added to a compound containing both chlorobutyl and bromobutyl rubbers, remarkable improvement in the adhesion of the rubber compound is attained. The extent of the improvement in adhesion is greater than what would be expected from: (1) the contribution to the adhesion of a blend of chlorobutyl and bromobutyl rubbers and (2) the incremental adhesion due to the addition of mineral rubber to chlorobutyl alone or bromobutyl rubber alone. Therefore, it is clear that the effect of improved adhesion according to the present invention is not a mere addition of the above two effects, but a synergistic effect between the blend and mineral rubber.

The effect of improved adhesion is particularly high when the blend ratio (by weight) of chlorobutyl rubber to bromobutyl rubber is from about 95:5 to about 50:50. Namely, in the case of a blend containing a major proportion of chlorobutyl rubber, the effect of improved adhesion obtained by the addition of an appropriate amount of mineral rubber is particularly large. This is very advantageous in that the adhesion of a chlorobutyl rubber compound can be improved without incorporating a large amount of bromobutyl rubber which is prone to scorch during processing and is more expensive than chlorobutyl rubber.

Mineral rubber is added to a blend of chlorobutyl rubber and bromobutyl rubber up to about 20 parts per 100 parts of the total of chlorobutyl and bromobutyl rubbers by weight. It results in remarkable adhesion improvement even when a small amount is used. On the other hand, higher amounts exceeding about 20 parts of mineral rubber are known to damage the mechanical properties of the composition (for example, resistance to flexing fatigue), which leads to a decrease of practical utility of the rubber compositions. The range of mineral rubber would be preferably about 2.5 to about 15 parts and most preferably about 5 to about 10 parts.

The invention may be better understood from the following description, taken with the accompanying drawing in which:

FIG. 2 shows the same comparison as in FIG. 1 in respect to the aged adhesion of the above samples.

FIG. 3 shows the same comparison as in FIG. 1 in respect to the unaged adhesion to the 100% natural rubber carcass compound.

FIG. 4 shows the relation between the mineral rubber content of a halogenated butyl rubber compound of the present invention (80/20 chlorobutyl/bromobutyl blend ratio) and the level of adhesion to the 60/40 natural rubber/polybutadiene carcass compound.

Figure 1:
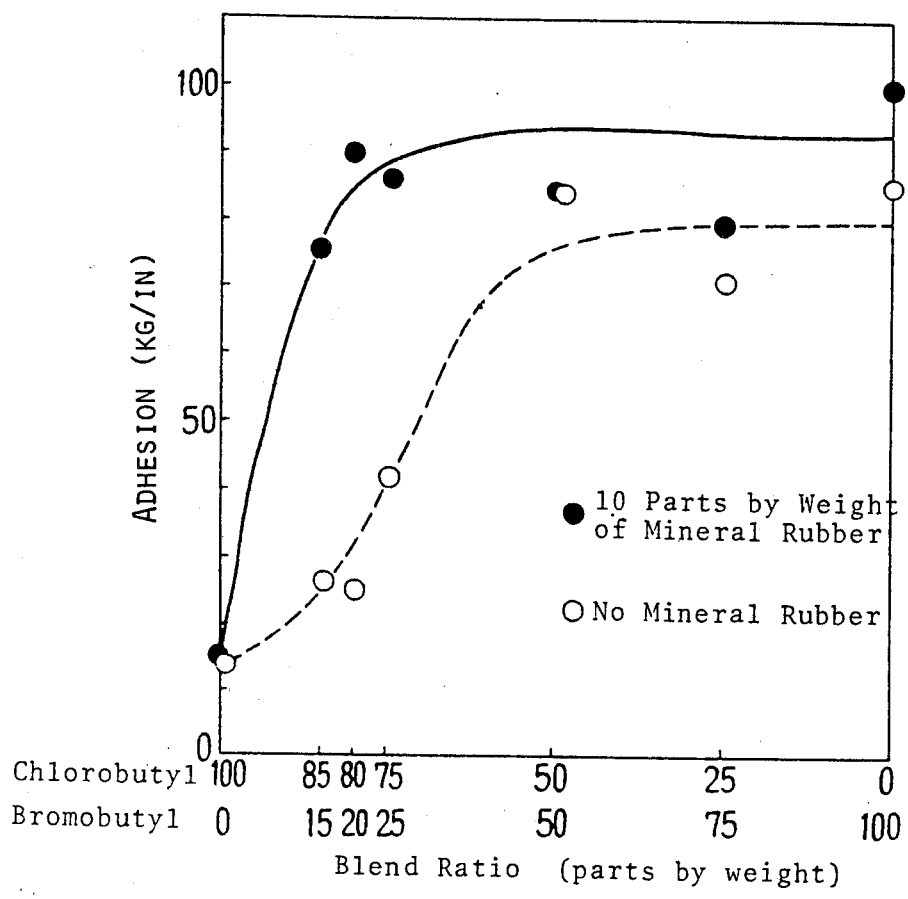
FIG. 1 shows a comparison of the composition of the invention, the halogenated butyl rubber blend compound containing mineral rubber, with the halogenated butyl rubber compound without mineral rubber in respect to the unaged adhesion to the 60/40 natural rubber/polybutadiene tire carcass compound, in the range of the chlorobutyl/bromobutyl blend ratio from 100:0 to 0:100.

Chlorobutyl rubber, bromobutyl rubber and mineral rubber may be compounded by any conventional methods. These components are usually mixed together with fillers and plasticizers in a mixer such as a Banbury mixer at temperatures of about 75° C. to about 180° C. for about 3 to about 8 minutes. Preferred mixing conditions comprise a temperature of about 150° C. and a mixing time of about 6 minutes.

The term "chlorobutyl rubber" used herein generally means those rubbers obtained by chlorinating copolymers which are prepared from a polymerization mixture comprising isoolefins (e.g., isobutylene) and conjugated multiolefins (e.g., isoprene). The above copolymers are generally called "butyl rubber". Commercially available butyl rubber comprises a major proportion of isobutylene units and a minor proportion of isoprene units. Conventional high molecular weight butyl rubber generally has a number average molecular weight of about 25,000 to about 500,000, preferably about 80,000 to about 300,000, more preferably about 100,000 to about 250,000, and has a Wijs iodine number of about 0.5 to 50, preferably 1 to 20. Low molecular weight butyl rubber as a number average molecular weight of 5,000 to 25,000, and mole % unsaturation of 2 to 10.

Chlorinated butyl rubber may be prepared by contacting butyl rubber in a solution of 1 to 60 weight % of butyl rubber in a substantially inert $C_5$–$C_8$ hydrocarbon solvent (e.g., pentane, hexane, heptane, etc.) with chlorine gas for about 2 seconds to about 25 minutes (see U.S. Pat. No. 3,099,644). The resultant chlorinated butyl rubber contains at least 0.5 weight percent based on copolymer and up to one chlorine atom per double bond intially present in the copolymer; see also U.S. Pat. No. 2,944,578.

The term "bromobutyl rubber" used herein means brominated butyl rubber. Bromination may be carried out by contacting butyl rubber with bromine or appropriate bromine-containing compounds. The resultant brominated butyl rubber contains about 0.5 to 3 bromine atoms per molecule of multiolefin. Typical brominating agents are molecular bromine, sodium hypobromite, sulfur bromide, N-bromosuccinimide, hydrogen bromide, etc. The bromination is advantageously conducted at temperatures of about $-50°$ C. to about $+150°$ C., preferaly about 20° C. to 60° C. for about one minute to several hours. The temperatures and time may be regulated so as to obtain the above bromine content.

The bromination may be carried out according to various methods. One method comprises preparing a solution of butyl rubber in a suitable unreactive organic solvent such as heptane, kerosene, toluene, chlorobenzene, trichloroethane, etc., and adding thereto gaseous or liquid bromine or a bromine compound. Another method comrises blending solid butyl rubber with a solid brominating agent such as N-bromosuccinimide which leads to allylic substitution. In such a case, the blend formed is preferably millmixed and advantageously heated to a temperature sufficient to brominate the solid butyl rubber. The milling pressure may be set higher or lower than atmospheric pressure, depending on the heating temperatures.

The term "high unsaturation rubber" means rubbers having unsaturation of at least about 30 mole %. Illustrative of such rubbers are natural rubber, styrene-butadiene rubber, polybutadiene, polyisoprene, polychloroprene and mixtures thereof.

By the term "mineral rubber" which is used in the claims and specification of present application, it is intended to mean petroleum or coal asphalts into which air may have been blown. When air has been blown, those asphalts are known as blown asphalts.

The mineral rubber used in the present invention is used in an amount up to about 20 parts by wt. per hundred parts of the total amount of chlorobutyl rubber and bromobutyl rubber. A preferred range is about 2.5 parts to about 15 parts per hundred part of the total amount of the two halogenated rubbers and most preferably about 5 to about 10 parts.

The compounds are prepared with the usual additives such as carbon black and other filler reinforcing materials, process oil, plasticizers and the like; said oil may be present in the amount of about 2 to about 10 parts by weight per 100 parts of halobutyl rubber.

The present invention will be explained in further detail by means of the following examples, while the scope of the present invention is not restricted thereby in any way.

EXAMPLE 1

Chlorobutyl rubber, bromobutyl rubber, fillers, plasticizers and mineral rubber in amounts as shown in Table 1 were charged into a Banbury mixer and mixed for 6 minutes. The mixture was dumped from the mixer after the temperature of the mixture reached about 150° C. The curatives shown in Table 1 were added to each mixture on a cool mill. Thus, halogenated butyl rubber blend compounds having various blend ratios of chlorobutyl rubber to bromobutyl rubber and mineral rubber contents of 0 to 10 parts by weight were obtained. Moreover, a typical carcass compound made of natural rubber and polybutadiene rubber having the formulation shown in Table 2 was prepared according to a similar method.

TABLE 1

| Halogenated Butyl Rubber Compound Parts by Weight | | | | | | | | | | | | | | |
|---|---|---|---|---|---|---|---|---|---|---|---|---|---|---|
| Chlorobutyl Rubber | 100 | 100 | 85 | 85 | 80 | 80 | 75 | 75 | 50 | 50 | 25 | 25 | 0 | 0 |
| Bromobutyl Rubber | 0 | 0 | 15 | 15 | 20 | 20 | 25 | 25 | 50 | 50 | 75 | 75 | 100 | 100 |
| GPF Carbon Black (N660) | ← | ← | ← | ← | ← | ← | 60 | → | → | → | → | → | → | → |
| Stearic Acid | ← | ← | ← | ← | ← | ← | 2 | → | → | → | → | → | → | → |
| Tackifier (Petroleum Hydrocarbon Resin) | ← | ← | ← | ← | ← | ← | 3 | → | → | → | → | → | → | → |
| Mineral Rubber[(1)] | 0 | 10 | 0 | 10 | 0 | 10 | 0 | 10 | 0 | 10 | 0 | 10 | 0 | 10 |
| Process Oil | 8 | 5 | 8 | 5 | 8 | 5 | 8 | 5 | 8 | 5 | 8 | 5 | 8 | 5 |
| ZnO | ← | ← | ← | ← | ← | ← | 3 | → | → | → | → | → | → | → |
| Sulfur | ← | ← | ← | ← | ← | ← | 0.5 | → | → | → | → | → | → | → |
| Mercaptobenzathiazyl disulfide (MBTS) | ← | ← | ← | ← | ← | ← | 1.5 | → | → | → | → | → | → | → |

Note
[(1)]Blown Asphalt 10-20 manufactured by Daikyo Sekiyu K.K.

TABLE 2

| Natural Rubber/Polybutadiene Carcass Compound | |
|---|---|
| | Parts by weight |
| Natural Rubber RSS#3 (Ribbed smoked sheet No. 3) | 60 |
| Polybutadiene JSR BR01* | 40 |
| Carbon Black (furnace type) | 50 |
| Process Oil | 10 |
| ZnO | 4 |

TABLE 2-continued

| Natural Rubber/Polybutadiene Carcass Compound | |
|---|---|
| | Parts by weight |
| Stearic Acid | 3 |
| Antioxidant | 1 |
| Sulfur | 1.75 |
| Accelerator | 0.8 |

Note
*Trade name of Japan Synthetic Rubber Co., Ltd.

A sheet of the above halogenated butyl rubber blend compound and a sheet of the carcass compound were lined respectively with a backing sheet, and attached to each other with both backing sheets outside. The backing sheet was a typical tire carcass made of a high unsaturation rubber compound frictioned onto a fabric of strong cords. The sample thus prepared was cured at 145° C. for 40 minutes in a press. Adhesion tests of the halogenated butyl rubber compound to the carcass compound were carried out according to ASTM D418-38. Adhesion values were determined by averaging two or more data actually measured. The results are shown in Table 3.

Next, test samples consisting of the same halogenated butyl rubber compound and the same carcass compound were subjected to a heat aging treatment, and then their adhesion properties were tested according to the same method as above. The heat aging treatment was conducted by exposing the sample at 100° C. for 48 hours for the compound of either chlorobutyl or bromobutyl rubber alone without mineral rubber, and at 120° C. for 48 hours for the other compounds according to JIS K6301 (Physical Testing Method for Cured Rubber). The results are also shown in Table 3.

TABLE 3

| Adhesion to Natural Rubber/ Polybutadiene Carcass Compound | | | | |
|---|---|---|---|---|
| Chlorobutyl Rubber* | Bromobutyl Rubber* | Mineral Rubber* | Adhesion (kg/in) | |
| | | | Original | Aged** |
| 100 | 0 | 0 | 15 | 26 |
| | | 10 | 14 | 65B |
| 85 | 15 | 0 | 26 | 26 |
| | | 10 | 75 | 75B |
| 80 | 20 | 0 | 25 | 22 |
| | | 10 | 89 | 75B |
| 75 | 25 | 0 | 42 | 26 |
| | | 10 | 86 | 70B |
| 50 | 50 | 0 | 84 | 28 |
| | | 10 | 84 | 71B |
| 25 | 75 | 0 | 71 | 23 |
| | | 10 | 79 | 59B |
| 0 | 100 | 0 | 85 | 59B |
| | | 10 | 98 | 71B |

(Note)
*Parts by weight
**Separation between the halogenated butyl rubber layer and the backing sheet occurred for all the compounds marked with "B". In this case, the data shown above correspond to the adhesion level between the halobutyl layer and the backing sheet.

The adhesion test results obtained on the original samples are plotted in FIG. 1 and those obtained on the aged samples are plotted in FIG. 2.

FIG. 1 shows that the addition of mineral rubber to the halogenated butyl rubber blend compound gives significantly higher adhesion levels as compared with those without mineral rubber especially in the range of chlorobutyl content between 100 and 50 parts by weight. In either case, whether mineral rubber is included or not in the compound, the adhesion value increases and levels off as bromobutyl content is increased from 0 to 100 parts by weight. With mineral rubber added, the 85/15 chlorobutyl/bromobutyl blend compound gives an adhesion already very close to the maximum level, while the same blend compound without mineral rubber gives an adhesion level which is still very low and far below the maximum plateau level. This significant improvement of the adhesion due to the addition of mineral rubber could not be expected since mineral rubber does not increase the adhesion level very much in a compound of chlorobutyl or bromobutyl alone. Therefore it can be considered that the significant adhesion improvement due to the inclusion of mineral rubber is caused by a synergistic effect of blending chlorobutyl, bromobutyl and mineral rubber.

With respect to the adhesion after aging, some samples separated between the halogenated butyl rubber layer and the backing sheet. However, it is reasonably clear that the adhesion between the halogenated butyl rubber compound and the mineral rubber/polybutadiene carcass compound is greater than that between the halogenated butyl rubber compound and the backing sheet which is shown by the data with mark "B", because if otherwise, separation would have occurred between the halogenated butyl rubber compound and the natural rubber/polybutadiene compound.

FIG. 2 shows that the adhesion after aging to the natural rubber/polybutadiene rubber carcass compound remains constant with changing blends for the series of compounds with mineral rubber and for those compounds without mineral rubber except for the 100% bromobutyl compound without mineral rubber which gives a higher adhesion value than other such compounds. The adhesion level of the compounds containing mineral rubber is far higher than that of the compounds without mineral rubber.

The mechanical properties of the rubber compounds of the present invention are comparable to those of pure chlorobutyl or bromobutyl compound with or without mineral rubber addition. The curing time thereof is somewhat reduced in the claimed blends which is advantageous. These data are shown in Table 4.

TABLE 4

| Comparison of Cure and Physical Characteristics | | | | | | |
|---|---|---|---|---|---|---|
| Bromobutyl | 100 | 0 | 0 | 20 | 20 | 100 |
| Chlorobutyl | 0 | 100 | 100 | 80 | 80 | 0 |
| Mineral Rubber | 0 | 0 | 10 | 0 | 10 | 10 |
| Curing Time* | | | | | | |
| TC90, mins | 32 | 32 | 18 | 21 | 13 | 21 |
| Original Physical Properties - Cured 145° C. × 40 mins. | | | | | | |
| Hardness, Shore A | 54 | 50 | 47 | 52 | 52 | 54 |
| 100% Modulus, kg/cm$^2$ | 10 | 8 | 8 | 11 | 10 | 10 |
| Tensile Strength, kg/cm$^2$ | 86 | 77 | 75 | 84 | 89 | 87 |
| Elongation, % | 810 | 910 | 1010 | 900 | 970 | 890 |

TABLE 4-continued

Comparison of Cure and Physical Characteristics

| Aged Physical Properties | ← | 48 hrs/100° C. | → | ← | 48 hrs/120° C. | → |
|---|---|---|---|---|---|---|
| Hardness, Shore A (change) | 58(+4) | 53(+3) | 52(+5) | 56(+4) | 56(+4) | 61(+7) |
| 100% Modulus, kg/cm² (RET.** %) | 18(180) | 12(150) | 11(138) | 15(136) | 14(140) | 19(190) |
| Tensile Strength, kg/cm² (RET. %) | 93(108) | 87(113) | 77(103) | 87(104) | 87(97) | 97(112) |
| Elongation % (RET. %) | 650(80) | 740(81) | 840(83) | 730(81) | 810(84) | 810(91) |

(Note)
*Monsanto Rheometer, 145° C., 100CPM, 5° arc.
**Retention

EXAMPLE 2

A halogenated butyl rubber blend compound was prepared according to the same method as in Example 1. In addition, a natural rubber carcass compound of the formulation as shown in Table 5 below was prepared according to the same method as in Example 1.

TABLE 5

Natural Rubber Carcass Compound

|  | Parts by weight |
|---|---|
| Natural Rubber RSS #3 (Ribbed smoked sheet) | 100 |
| Carbon Black (furnace type) | 50 |
| Process Oil | 10 |
| ZnO | 5 |
| Stearic Acid | 3 |
| Antioxidant | 1 |
| Sulfur | 2.5 |
| Accelerator | 0.5 |

Samples were prepared from the halogenated butyl rubber blend compound and the natural rubber carcass compound according to the same method as in Example 1, and were subjected to adhesion test before and after heat aging. The results are shown in Table 6.

TABLE 6

Adhesion of Halogenated Butyl Rubber Blend Compound to Natural Rubber Carcass Compound

| Chlorobutyl Rubber* | Bromobutyl Rubber* | Mineral Rubber* | Adhesion (kg/in) Unaged | Adhesion (kg/in) Aged** |
|---|---|---|---|---|
| 100 | 0 | 0 | 20 | 42 |
|  |  | 10 | 20 | 85 |
| 85 | 15 | 0 | 49 | 44 |
|  |  | 10 | 97 | 88 |
| 80 | 20 | 0 | 73 | 45 |
|  |  | 10 | 90 | 86 |
| 75 | 25 | 0 | 81 | 52 |
|  |  | 10 | 86 | 88 |
| 50 | 50 | 0 | 83 | 52 |
|  |  | 10 | 85 | 72 |
| 25 | 75 | 0 | 86 | 49 |
|  |  | 10 | 82 | 70 |
| 0 | 100 | 0 | 85 | 65 |
|  |  | 10 | 93 | 67 |

Note
*Parts by weight
**The separation occurred nearly always between the halobutyl layer and the backing layer so that the data shown above correspond to the adhesion between the halogenated butyl rubber layer and the backing sheet.

The adhesion of the original samples is plotted in FIG. 3.

This figure shows similar trends as were observed in FIG. 1 in which the adhesion of the halogenated butyl rubber compound to the natural/polybutadiene rubber carcass compound is shown.

EXAMPLE 3

Various amounts of mineral rubber ranging up to 20 parts by weight were added to a compound having the chlorobutyl/bromobutyl blend ratio of 80/20, and the adhesion test samples were prepared in the same way as in Example 1, using the 60/40 natural rubber/polybutadiene blend carcass compound. The amount of process oil in the compound was adjusted depending on the content of mineral rubber so that the processing and mechanical characteristics of the compounds can be kept at a similar level.

The samples were cured in a press for 40 minutes and 60 minutes. Adhesion was measured on each of the samples before and after aging. The results are shown in Table 7.

TABLE 7

Adhesion of Chlorobutyl/Bromobutyl Compound of 80/20 Blend Ratio to Natural Rubber/Polybutadiene Carcass Compound of 60/40 Blend Ratio
Makeup of Chlorobutyl/Bromobutyl Blend Compound (Parts by Weight)

| | | | | | | |
|---|---|---|---|---|---|---|
| Chlorobutyl Rubber | ← | ← | 80 | → | → | → |
| Bromobutyl Rubber | ← | ← | 20 | → | → | → |
| Mineral Rubber | 0 | 2.5 | 5 | 7.5 | 10 | 20 |
| Process Oil | 8 | 7.25 | 6.5 | 5.75 | 5 | 2 |
| Adhesion (kg/in) | | | | | | |
| 40 min. Cured Original | 25 | 69 | 84 | 91 | 88 | 85 |
| 40 min. Cured Aged | 22 | 44 | 58 | 65 | 66 | 69 |
| 60 min. Cured Original | 22 | 70 | 89 | 93 | 89 | 78 |
| 60 min. Cured Aged | 20 | 38 | 57 | 65 | 66 | 64 |

The 40 minute cure data in the above table are plotted in FIG. 4. FIG. 4 shows that mineral rubber provides remarkable adhesion improvement even with such a small amount as 2.5 parts, for both the unaged and aged samples. However, when the mineral rubber content exceeds 10 parts, the adhesion levels off.

EXAMPLE 4

The same experiments as Example 3 were carried out using the 80/20 chlorobutyl/bromobutyl blend compound and the 100% natural rubber carcass compound. The results are similar to those of Example 3 and are shown in Table 8.

TABLE 8

Adhesion of 80/20 Blend Ratio Chlorobutyl/Bromobutyl Blend Compound to Carcass Compound of 100% Natural Rubber
Makeup of Chlorobutyl/Bromobutyl Blend Compound (Parts by Weight)

| | | | | | | |
|---|---|---|---|---|---|---|
| Chlorobutyl Rubber | ← | ← | 80 | → | → | → |
| Bromobutyl Rubber | ← | ← | 20 | → | → | → |
| Mineral Rubber | 0 | 2.5 | 5 | 7.5 | 10 | 20 |

TABLE 8-continued

Adhesion of 80/20 Blend Ratio Chlorobutyl/Bromobutyl Blend Compound to Carcass Compound of 100% Natural Rubber Makeup of Chlorobutyl/Bromobutyl Blend Compound (Parts by Weight)

| Process Oil | | 8 | 7.25 | 6.5 | 5.75 | 5 | 2 |
|---|---|---|---|---|---|---|---|
| Adhesion (kg/in) | | | | | | | |
| 40 min. Cured | Original | 73 | 80 | 87 | 79 | 80 | 79 |
| | Aged | 45 | 70 | 68 | 74 | 79 | 69 |
| 60 min. Cured | Original | 71 | 79 | 78 | 86 | 89 | 77 |
| | Aged | 46 | 67 | 65 | 75 | 78 | 65 |

EXAMPLE 5

The same experiments as Examples 3 and 4 were carried out using the chlorobutyl/bromobutyl blend ratio of 85/15. The results are shown in Table 9.

TABLE 9

Adhesion of 85/15 Blend Ratio Chlorobutyl/Bromobutyl Blend Compound to Natural Rubber Carcass Compound and to Natural Rubber/Polybutadiene Carcass Compound of 60/40 Blend Ratio Makeup of Chlorobutyl/Bromobutyl Blend Compound (Parts by Weight)

| Chlorobutyl Rubber | | ← | ← 85 → | → |
|---|---|---|---|---|
| Bromobutyl Rubber | | ← | ← 15 → | → |
| Mineral Rubber | | 0 | 2.5 | 7.5 | 10 |
| Process Oil | | 8 | 7.25 | 5.75 | 5 |
| Adhesion (kg/in) | | | | | |
| Natural Rubber Carcass Compound | | | | | |
| 40 min. Cured | Original | 49 | 78 | 78 | 88 |
| | Aged | 44 | 63 | 66 | 63 |
| 60 min. Cured | Original | 56 | 78 | 81 | 82 |
| | Aged | 47 | 66 | 66 | 64 |
| Natural Rubber/Polybutadiene Carcass Compound of 60/40 Blend Ratio | | | | | |
| 40 min. Cured | Original | 26 | 43 | 84 | 91 |
| | Aged | 26 | 44 | 64 | 66 |
| 60 min. Cured | Original | 27 | 57 | 85 | 84 |
| | Aged | 25 | 50 | 69 | 65 |

EXAMPLE 6

The same experiments as Examples 3 and 4 were carried out using the chlorobutyl/bromobutyl blend ratio of 75/25. The results are shown in Table 10.

TABLE 10

Adhesion of 75/25 Blend Ratio Chlorobutyl/Bromobutyl Blend Compound to Natural Rubber Carcass Compound and to Natural Rubber/Polybutadiene Carcass Compound of 60/40 Blend Ratio

| Mineral Rubber | | 0 | 2.5 | 7.5 |
|---|---|---|---|---|
| Process Oil | | 8 | 7.25 | 5.75 |
| Adhesion (kg/in) | | | | |
| Natural Rubber Carcass Compound | | | | |
| 40 min. Cured | Original | 81 | 76 | 81 |
| | Aged | 52 | 68 | 73 |
| 60 min. Cured | Original | 82 | 82 | 81 |
| | Aged | 44 | 65 | 69 |
| Natural Rubber/Polybutadiene Carcass Compound of 60/40 Blend Ratio | | | | |
| 40 min. Cured | Original | 42 | 88 | 81 |
| | Aged | 26 | 51 | 64 |
| 60 min. Cured | Original | 45 | 86 | 86 |
| | Aged | 26 | 48 | 62 |

The rubber compounds of the present invention have excellent cured adhesion to high unsaturated rubber compounds, and the above adhesion is maintained at a high level even after heat aging. This is very desirable for the purpose of preventing the deterioration of tire performance due to the heat aging under service conditions.

In addition, the rubber compounds of the present invention have substantially the same mechanical properties as those of pure chlorobutyl or bromobutyl or a blend thereof. As for curing time, it is slightly shorter than it is in the case of these other rubbers, which is advantageous.

What is claimed is:

1. A rubber composition having high cured adhesion to high unsaturation rubber compounds comprising chlorobutyl and bromobutyl rubbers and up to about 20 parts by weight per 100 parts of the total amount of chlorobutyl and bromobutyl rubbers of a mineral rubber.

2. A rubber compound according to claim 1 wherein the blend ratio by weight of chlorobutyl rubber to bromobutyl rubber is about 95:5 to about 50:50.

3. A rubber compound according to claims 1 or 2 wherein the mineral rubber content is about 2.5 to about 15 parts by weight per 100 parts of the total amount of chlorobutyl and bromobutyl rubbers.

4. A rubber compound according to claim 1 further comprising about 2 to about 10 parts per hundred parts of the total amount of chlorobutyl and bromobutyl rubber of a process oil.

5. A rubber compound according to claim 1 wherein said high unsaturation rubber is selected from the group consisting of natural rubber, styrene-butadiene rubber, polybutadiene, polyisoprene, polychloroprene and mixtures thereof.

* * * * *